Figure 1:
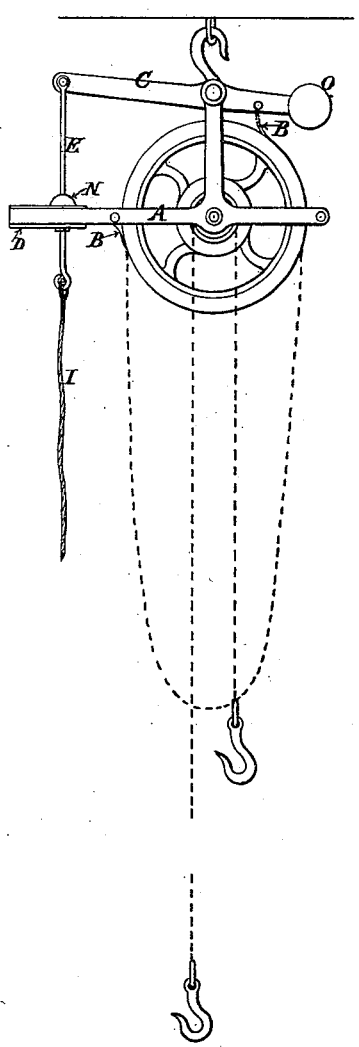

(No Model.)

F. LEY.
BRAKE APPARATUS FOR PULLEY BLOCKS, &c.

No. 246,795. Patented Sept. 6, 1881.

Witnesses:
H. C. McArthur
J. A. Stockman

Inventor
Francis Ley,
per
C. H. Watson Co., Attorney.

UNITED STATES PATENT OFFICE.

FRANCIS LEY, OF DERBY, ENGLAND.

BRAKE APPARATUS FOR PULLEY-BLOCKS, &c.

SPECIFICATION forming part of Letters Patent No. 246,795, dated September 6, 1881.

Application filed February 12, 1881. (No model.) Patented in England June 19, 1877.

*To all whom it may concern:*

Be it known that I, FRANCIS LEY, of the Vulcan Iron-Works, Derby, England, have invented new and useful Improvements in Brake Apparatus for Pulley-Blocks, applicable also for crabs, cranes, winches, and other machines, which improvements are fully set forth in the following specification, reference being had to the accompanying drawings.

This invention has for its object improvements in brake apparatus for pulley-blocks, applicable also for crabs, cranes, winches, and other machines.

In pulley-blocks as now commonly constructed the frame is of an inverted-T form. The hook by which the pulley-block is suspended is attached to the end of the stem of the T-frame, and to this end of the stem is also jointed a brake-lever. A brake-strap passing partly around one of the pulleys is attached at one end to the extremity of one arm of the head of the T-frame, while the other end of the strap is connected to the brake-lever, or the brake-lever has both ends of the strap secured to it. To this lever is also connected a cord, by pulling which the brake-strap can be tightened around the pulley and the load either prevented from running down or its descent regulated, as may be desired. If, however, the cord is slackened the load at once runs down.

According to my invention, I joint to the extremity of the brake-lever a rod passing through the center of and carrying a ball. To the end of this rod I connect the cord by which the brake is to be applied. The rod passes through a slot in a plate carried by a prolongation of the head of the inverted-T frame. When the brake is not in use the ball on the rod is above the plate. When the cord is pulled on the brake is applied and the ball is drawn downward through the slot in the plate.

If it is desired to keep the load suspended the lower end of the rod is by the cord swung outward away from the pulleys. The rod then moves through a narrow portion of the slot in the plate, and the upper part of the ball enters a cup-shaped hollow at the outer extremity of the slot. This extremity of the slot is of such size as not to allow the ball to pass through it. The cord may then be released and the brake will still continue to hold the pulley. There is sufficient spring in the brake lever and strap to enable the ball to be thus sprung into the cup-shaped recess.

To release the brake the cord merely requires a steady pull to bring it into its normal position. The descent of the load can then readily be regulated by the man holding the cord.

The brake apparatus above described is also applicable to crabs, cranes, winches, and other machines.

The drawings hereunto annexed show a pulley-block with brake apparatus applied to it in the manner above described.

Figure 2:
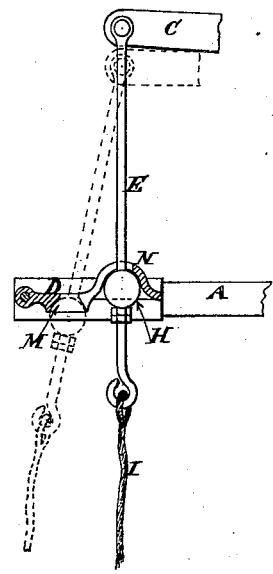
Figure 3:
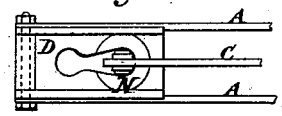
Figure 4:
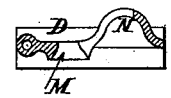

Figure 1 is a side elevation of the pulley-block with its brake apparatus. Fig. 2 shows a section of the locking-plate, and also the end of a brake-lever with the rod and ball dependent from it. Fig. 3 shows a plan view of the same. Fig. 4 shows separately a section of the locking-plate.

A is the inverted-T frame, carrying the pulleys.

B is the brake-strap, jointed to one arm of the T-frame, and, after being carried partly around one of the pulleys, jointed to the brake-lever C in the ordinary manner.

D is the locking-plate, secured to the arm of the T-frame, to which the brake-strap is connected, the bars of which composing the arm being prolonged, so as to carry the plate.

E is the rod hanging down from the end of the brake-lever C, and passing through a slot in the plate D.

H is the ball secured to the rod E; I, a cord hanging down from the end of the rod E.

When the brake is to be applied the rod is pulled downward by the cord I and drawn into the position shown by the dotted lines in Fig. 2, so that the ball may rest in the cup-shaped hollow M on the under side of the plate D. When the brake is required to be released the cord is again pulled on and the rod swung back to its former position. The counterbalance-weight O at the end of the brake-lever will then cause the ball to rise up into the larger cup N, formed on the plate, or might simply cause it to rise up through a hole in this plate. The same arrangement of brake apparatus can be used with the brake wheels or pulleys of crabs, cranes, winches, and other machines.

Having thus described my invention, what I claim as new, and desire to secure by Letters Patent, is—

The combination, with the brake-lever of pulley-blocks, of a rod and ball, said rod passing a slot in a plate that is secured to one of the arms of the T-frame of the pulley, and adapted to fit within a cup-shaped recess at the outer end of the slot when the brake-lever is to be held down, and enter or pass through a deeper cup or opening at the opposite end of the slot when the brake is off and the lever set free, substantially as specified.

FRANCIS LEY.

Witnesses:
 GEO. W. REYNOLDS,
  77 *Regent Street, Derby,*
 J. W. ROWBOTHAM,
  15 *Newland Street, Derby,*
*Clerks with Mr. John Moody, Solicitor and Notary Public, Derby, England.*